(12) United States Patent
Chen

(10) Patent No.: US 7,006,885 B2
(45) Date of Patent: Feb. 28, 2006

(54) METHOD FOR GENERATING A SUGGESTIVE DISPATCH LOT LIST THAT CONSIDERS UPSTREAM/DOWNSTREAM STAGE REQUIREMENTS

(75) Inventor: Yen-Hung Chen, Changhua (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 70 days.

(21) Appl. No.: 10/464,956

(22) Filed: Jun. 19, 2003

(65) Prior Publication Data

US 2004/0260419 A1 Dec. 23, 2004

(51) Int. Cl.
G06F 19/00 (2006.01)

(52) U.S. Cl. .................. 700/102; 700/100; 700/101
(58) Field of Classification Search .................. 700/95, 700/97, 99, 100, 101, 102, 107, 108, 109, 700/121; 705/700, 744, 769
See application file for complete search history.

(56) References Cited

U.S. PATENT DOCUMENTS

| | | | |
|---|---|---|---|
| 5,050,088 A | 9/1991 | Buckler et al. | |
| 5,099,431 A | 3/1992 | Natarajan | |
| 5,768,133 A | 6/1998 | Chen et al. | |
| 6,041,267 A * | 3/2000 | Dangat et al. | 700/100 |
| 6,119,102 A * | 9/2000 | Rush et al. | 705/29 |
| 6,256,548 B1 | 7/2001 | Lin | |
| 6,263,253 B1 | 7/2001 | Yang et al. | |
| 2002/0142568 A1 | 10/2002 | Chang et al. | |
| 2002/0165633 A1 | 11/2002 | Hsu | |
| 2003/0065415 A1 * | 4/2003 | Hedge et al. | 700/100 |
| 2003/0225474 A1 * | 12/2003 | Mata et al. | 700/121 |

* cited by examiner

*Primary Examiner*—Leo Picard
*Assistant Examiner*—Charles Kasenge
(74) *Attorney, Agent, or Firm*—Duane Morris LLP

(57) ABSTRACT

A method for generating a suggestive dispatch lot list for use by a production line operator in selecting, from a plurality of lots, the lot to process at one of plurality of fabrication stages to maintain a predetermined production plan and fabrication target. The method involves sorting a plurality of lots, that are to be processed in the production line during a predetermined time period, in a list according to production line demand and supply between upstream and downstream fabrication stages.

15 Claims, 2 Drawing Sheets

METHOD FOR GENERATING A SUGGESTIVE DISPATCH LOT LIST THAT CONSIDERS UPSTREAM/DOWNSTREAM STAGE REQUIREMENTS

FIELD OF THE INVENTION

The present invention relates to a method for generating a suggestive dispatch lot or WIP list that considers upstream/downstream stage requirements. The list is used by a production line operator to select from a plurality of lots, the best lot to process at a fabrication stage.

BACKGROUND OF THE INVENTION

The most important goals of every manufacturer are to meet customer required due dates and maintain high production yields. In semiconductor manufacturing, the production line usually operates 24 hours a day. Therefore, maintaining the production line balance and the production plan are the most troublesome tasks for planners and manufacturers.

There are many factors that influence the flow of work-in-progress (WIP) in a production line, including without limitation equipment resources, process judgments, WIP requirements, unexpected system failures. One of the more important of these factors is the supply and demand relationship between upstream/downstream production stages. In a WIP's process procedure (route), there are certain key production stages that require special treatments. These special treatments may involve, for example, special methods or longer than average processing time, which cause these stages to become production bottlenecks. The WIP flow often becomes abnormal when passing these key stages, if the production dispatching system cannot help to identify the abnormal situation. If the production line operators do not realize what is happening, the situation often becomes more serious. For example, if up-stream processing equipment fails and stops providing a certain kind of push WIP, and bottleneck processing equipment has been allocated to process the push WIP, the bottleneck equipment may incur a loss due to the lack of push WIP. This course of events creates a risk that the push WIP may miss its target, causing a waste of equipment utilization, and influencing the line balance.

In a production line, the production line operators typically obey the process instructions from leaders or supervisors. These process instructions are often derived from a production plan and a production target. However, since circumstances change virtually every second on the production line, the operators need a suggestion system to tell them what to do. One such suggestion system is a dispatch system. Conventional dispatch systems generate a dispatch WIP or lot list that records the number of WIPs or lots in the production line and the priority status of the WIPs. The dispatch WIP list enables the operators to realize how many WIPs are waiting for them and the urgency of each WIP.

Conventional dispatch WIP lists consider priority and other constrained conditions. Specifically, a conventional dispatch WIP list may contain explicit information such as processing technique, product identification (ID), queue time limit or future actions of the WIP, and implicit information such as the urgency level of the WIP and the necessity. Traditional dispatch WIP lists ignore the balance of demand and supply between upstream and downstream production stages. This is a problem because, in practice, an operator will typically check the first several lots on the dispatch WIP list even if there are 90 lots in the list, just to save reading time. If the first several lots are experimental lots, the operator may spend more time to find a production lot or just take the first lot. However, both of these actions wastes time, leads to line imbalance, and decreases the efficiency of production.

Accordingly, a method is needed for generating a dispatch WIP list that overcomes the deficiencies described above.

SUMMARY OF THE INVENTION

The present invention is a method for generating a suggestive dispatch lot list for use by a production line operator in selecting, from a plurality of lots, the lot to process at one of plurality of fabrication stages to maintain a predetermined production plan and fabrication target. The method comprises the steps of: providing a plurality of lots to be processed in the production line during a predetermined time period; and sorting the lots in the list according to production line demand and supply between upstream and downstream fabrication stages.

DETAILED DESCRIPTION OF THE INVENTION

The present invention is a method used by a dispatch system for generating a suggestive dispatch lot list for each fabrication stage of a production line, where the order of the lots (referred to collectively as WIP) to be performed in the list is set according to a plurality of sorting factors or rules. The suggestive dispatch lot or WIP list may then be used by a production line operator at a corresponding production line fabrication stage, to select from a plurality of lots, the best lot to process at that fabrication stage.

The method of the present invention considers upstream/downstream fabrication stage requirements. The upstream/downstream fabrication stage requirements may be defined by considering that although production lines are usually always operating, planners and manufacturers typically calculate predicted product output values for all the fabrication stages in a daily production meeting. These predicted output values or targets, may be generated according to a monthly production plan and product fabrication target which sets forth the quantity of every product needed to be manufactured during that month. Since each fabrication stage target is predetermined, an operator of that stage must process the WIP in a manner that meets that target.

The sorting factors of the present invention include factors which consider supply and demand balance between the upstream and downstream fabrication stages of the production line (upstream/downstream stage requirement). The use of a suggestive dispatch WIP list generated according to the present invention for selecting a lot for processing will operate to automatically adjust the WIP flow rate to maintain production line demand and supply between upstream and downstream fabrication stages, thereby matching the production plan and production fabrication target (typically generated monthly), maintaining line balance and satisfying Confirm Line Item Performance (CLIP), i.e., the capability of on time delivery to the customer.

Figure 1:
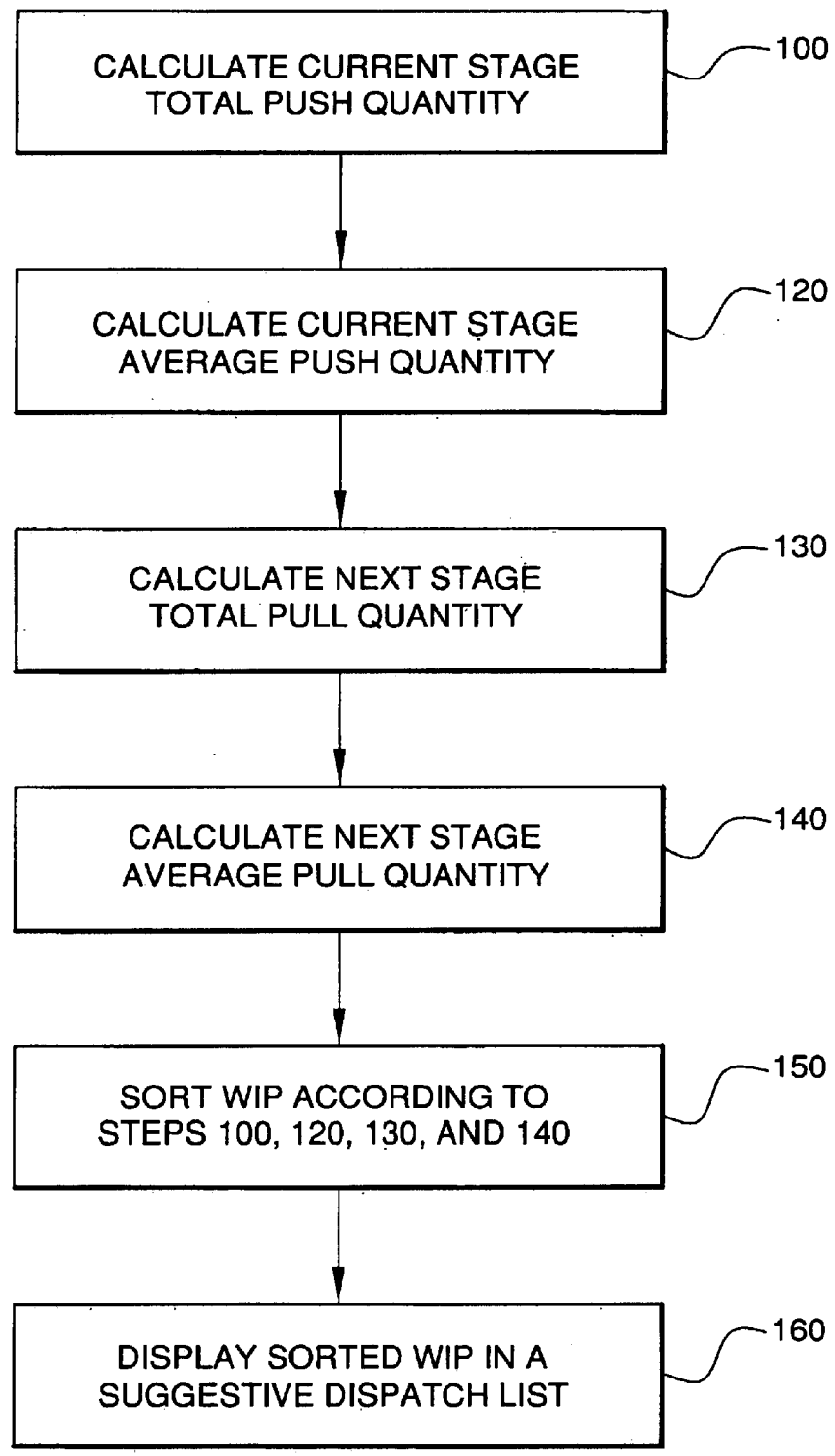
FIG. 1 is a flow chart depicting steps of the method of the present invention.

The method of the present invention will now be described with reference to the flow chart of FIG. 1. Before performing the method, the quantity of every product needed to be manufactured during a predetermined time period, such as in one month, must be determined. Such a determination is typically made in the production plan and fabrication target described earlier. The dispatching system then generates a dispatch lot list which contains unsorted WIP for current equipment.

The method commences with step 100, by calculating the current stage total push quantity of every fabrication stage of the unsorted WIP listed on the dispatch lot list. The current stage push quantity calculation may be illustrated using the following exemplary scenario. Fabrication stage A is bottleneck and it receives WIP (lots of parts to be processed) from many other stages. If the speed of the production output of stage A is insufficient, the WIP flow will be reduced at this stage and the WIP supplied from upstream stages will begin to queue at stage A thereby causing a WIP flow jam at stage A. So fabrication stage A needs to output or push more WIP to the next fabrication stages in order to eliminate the queued WIP queued at stage A.

Therefore, the lots at fabrication stage A are assigned a higher priority by calculating the current stage total push quantity. The greater the current stage total push quantity is, the higher the priority of the lots at that stage will be. The current stage total push quantity calculation, for every fabrication stage, is the remaining number of lots needed to meet the stage's output target. The result of this calculation is the total number of lots needed to push to the next fabrication stage. Assume that ST( ) represents the stage target, and SM( ) represents stage move, then the current stage total push quantity may be calculated as follows:

Current Stage Total Push Quantity=max[0,$ST$(Current)-$SM$(Current)]

A lot that has finished a fabrication stage's process is called a stage move. Hence, the subtrahend is the total number of lots that have finished the current fabrication stage's process in a predetermined time period, for example, in one production day.

The current stage total push quantity does not account for emergencies which may occur between fabrication stages. For example, in a second scenario, the total push quantities of fabrication stage B and fabrication stage C may be 100 and 200 respectively, but the process time of stage B may be 20 minutes per lot, and the process time of stage C may be 5 minutes per lot. Thus, it would take about 2000 minutes for stage B to achieve the target of 100, but only 1000 minutes for Stage C to achieve the target of 200. Based on these facts, even though stage C has the larger of the two push quantities, stage B takes more time to processed and therefore, should be processed first.

The method addresses this limitation in step 120, by calculating the current stage average push quantity. The current stage average push quantity may be calculated as follows:

Current Stage Average Push Quantity =

$$\max\left\{0, \left[ST(\text{Current}) \times \frac{T}{PT}\right] - SM(\text{Current})\right\}$$

where T is the time intervals (e.g., hours) passed during the predetermined time period or interval PT mentioned earlier, which may be, for example, the total number of time intervals in one production time period e.g., one day or 24 hours.

The current stage average push quantity can be further explained as follows. If production is operating smoothly, $ST$(Current)/$PT$ lots per hour should be processed. At time T, T×$ST$(Current)/$PT$ lots should have been processed. However, the number of lots actually completed is the current stage move SM(Current), and the difference between T×$ST$(Current)/$PT$ and SM(Current) is the unreached target at time T (in the hours passed). The larger the value of the current stage average push quantity is, the more urgent the stage should be. Since this is derived from the average production speed, it is called "the average push quantity".

In a third scenario, equipment D is a bottleneck that supplies WIP for many stages, and stages E and F are two stages that can be processed on equipment D. When deciding which lot should be processed on equipment D, the decision may be made by comparing the current stage average/total push quantity. But there may not be so many up stream stages in front of D. In fact, there are many down stream stages behind D, and some of them may require a large quantity of WIP to achieve their targets. Thus, for every stage using D as its process equipment, a succeeding stage can be found by mapping the current stage id and the product id. Once the next stage is found, the method in step 130 calculates the total number of lots required of this next stage, or in other words "pulled" from previous stage. The next stage total pull quantity may be calculated as follows:

Next Stage Total Pull Quantity=max{0,$ST$(Next)-$SM$(Next)+$SC$(Next)]} where SC( ) is the current queued WIP in the stage. Because there are already some lots in the next stage, these lots are subtracted from the required lots to obtain the exact quantity to pull from previous stage.

The next stage total pull quantity does not account for emergencies which may occur between fabrication stages. To avoid this problem, the method in step 140 calculates the next stage average pull quantity, which may be calculated as follows:

Next Stage Average Pull Quantity =

$$\max\left\{0, ST(\text{Next}) \times \frac{T}{PT} - [SM(\text{Next}) + SC(\text{Next})]\right\}$$

In step 150 of the method, the WIP is sorted according to 1) the current stage push quantity, 2) the current stage average push quantity, 3) the next stage total pull quantity, and 4) the next stage average pull quantity. In step 160 the WIP is displayed or printed in a suggestive dispatch list in accordance with the sorting performed in step 150.

Figure 2:
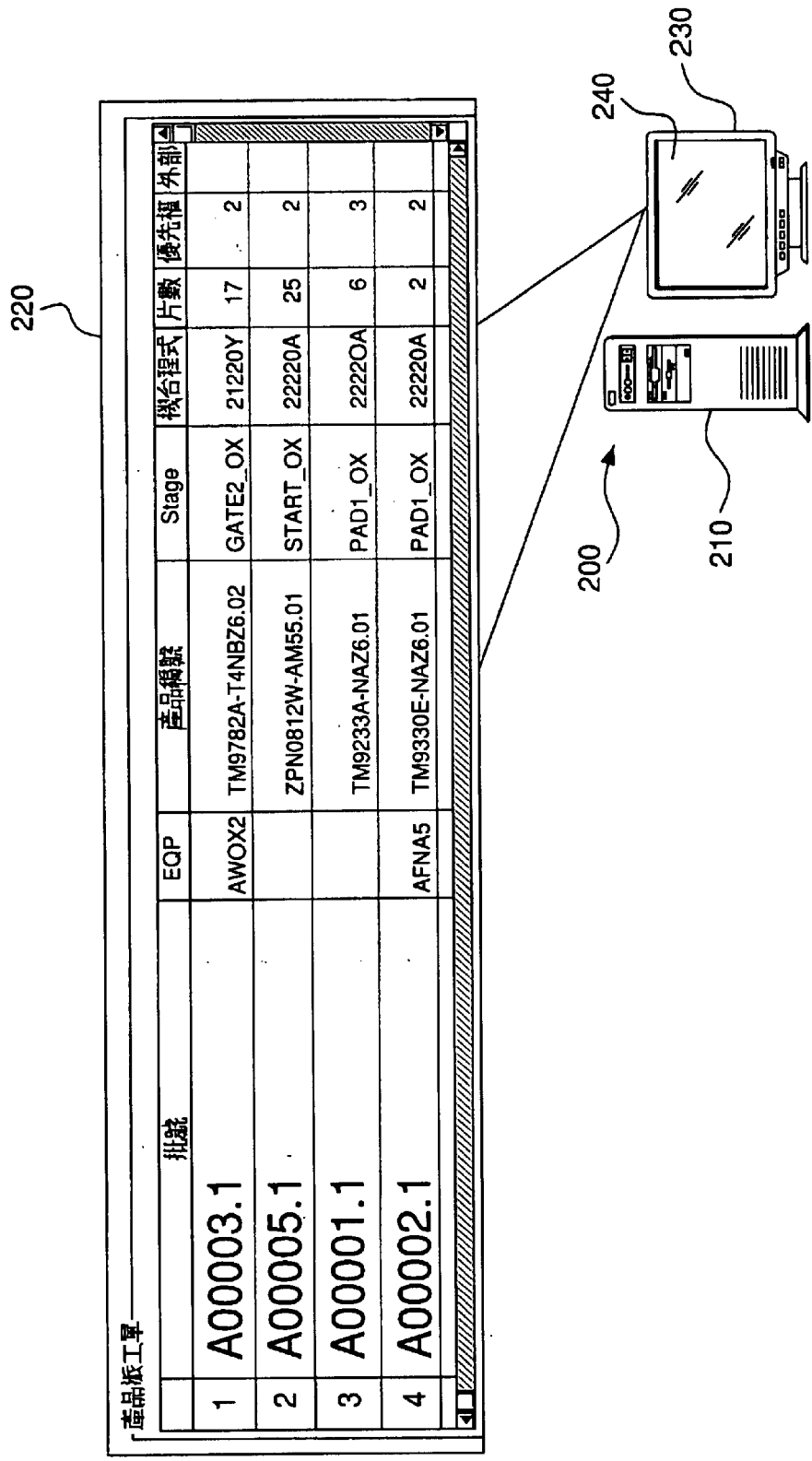
FIG. 2 is a diagram of a computer system which may be used to implement the method of the present invention.

As shown in FIG. 2, the WIP set forth in the suggestive dispatch list 220 according to the present invention, is ranked in order of importance and according to the upstream/downstream requirements at each fabrication stage.

In addition to the above sorting factors, the WIP may also be sorted according to a number of conventional sorting factors. Some of these sorting factors include without limitation backup flag, suggestive priority of WIP, and queue time limit lot.

The backup flag sorting factor relates to instances when there are deficiencies in fabrication process resources. For example, in an original location, there may not be enough resource, such as equipment, for a certain lot. In response to this, the production planner may arrange for equipment in a different location to process that lot if the equipment in the different location is capable of handling the WIP. This process of assigning equipment in a different location to share the processing load is referred to as "backup". Thus, to help share the load of other equipment and maintain production line balance, which is the most important task, lots with a backup flag typically always have the highest rank in the dispatch list.

The queue time limit sorting factor relates to fabrication steps which must be performed within a certain time frame. For example, the lot to be executed in a next fabrication stage may need to be processed within some specified time period because certain process chemicals used in a previous fabrication stage may have a limited effective time. In response to this, a queue time limit is assigned to that lot in the next fabrication stage. If the queue time limit expires, some of the lot may have to be reprocessed in the previous step for the chemical effect, thus, wasting equipment capacity, or be scraped because it can not be processed again. To avoid expiring of the queue time limit, such lots typically have a higher rank to aid in moving these lots through these stages more quickly.

The lot priority sorting factor relates to the assignment of a priority showing the importance of a new lot, when the lot is scheduled for processing. This priority is only a rough class, to distinguish the difference within a priority level, an additional value called external priority is often assigned to it. For combinations of priority and external priority, production planners and manufacturers often define some special classes to remind the operators about the importance of a lot, Such classes may include "super hot lot", "hot lot", "push lot" and "slow moving lot". Since these classes deliver important information, lots ranked by priority and external priority is performed.

Due to the different characteristics of the locations, the weighting of the sorting factors, including the current stage push quantity, current stage average push quantity, next stage total pull quantity, and next stage average pull quantity may be different. The sorting factors which are typically given the greatest weight in the dispatch system and method of the present invention, in every stage, are the backup flag, the queue time limit and lot priority.

In bottleneck stages, the upstream/downstream stage requirement typically receives a fourth place ranking or weighting in the dispatch list. In stages, such as furnace, WIP easily stocks up without good management due to its long processing time. Thus, when dispatching furnace stages, current stage push quantity can be included as one of the sorting factors used by the present invention to generate a dispatch list which can be used by the operator in the furnace stage to help release the jam of WIP in the stages which are prior to the furnace stage.

Some bottleneck stages may receive WIP from many up-stream stages and supply many down-stream stages. To use these sorting factors of the present invention, it is necessary to compare the importance of current stage push WIP or next stage pull WIP and arrange the order when applying these rules.

As shown in FIG. 2, the method of the present invention can be implemented conventionally, for example without limitation, on any well known computer system 200, as well and other devices. The computer system 200 may include one or more computers 210 each having one or more processors and one or more data storage devices. The method may be provided in the form of one or more software programs stored in the one or more data storage devices of the computer or computers 210 and executed by the computers' one or more processors. More specifically, the method of the present invention may be implemented by computer readable code executed by the one or more computers 210. The code may be stored in the one or more data storage devices or read/downloaded from a memory medium such as a CD-ROM or floppy disk. In other embodiments, hardware circuitry may be used in place of, or in combination with, software instructions to implement the invention. The suggestive dispatch list 220 may be displayed on a display screen 240 of one or more computer monitors 230 associated with the computer system 200.

While the foregoing invention has been described above with reference to one or more embodiments, various modifications and changes can be made without departing from the spirit of the invention. Accordingly, all such modifications and changes are considered to be within the scope of the appended claims.

What is claimed is:

1. A method of generating a suggestive dispatch lot list for use by a production line operator in selecting, from a plurality of lots, the lot to process at one of plurality of fabrication stages to maintain a predetermined production plan and fabrication target, the method comprising the steps of:

providing a plurality of lots to be processed in the production line during a predetermined time period; and sorting the lots in the list according to production line demand and supply between upstream and downstream fabrication stages, the sorting step including the step of calculating a current stage total push quantity.

2. The method according to claim 1, wherein the calculating step is performed by subtracting a current stage move from a current stage target.

3. The method according to claim 1, wherein the current stage total push quantity is calculated for each of the fabrication stages.

4. The method according to claim 1, wherein the sorting step further includes the step of calculating a current stage average push quantity.

5. The method according to claim 4, wherein the calculating step is performed by subtracting a current stage move from a current stage target averaged over a second predetermined time period.

6. The method according to claim 4, wherein the current stage average push quantity is calculated for each of the fabrication stages.

7. The method according to claim 1, wherein the sorting step further includes the step of calculating a next stage total pull quantity.

8. The method according to claim 7, wherein the calculating step is performed by subtracting the sum of a next stage move and a next stage current WIP, from a next stage target.

9. The method according to claim 7, wherein the next stage average total pull quantity is calculated for each of the fabrication stages.

10. The method according to claim 1, wherein the sorting step further includes the step of calculating a next stage average pull quantity.

11. The method according to claim 10, wherein the calculating step is performed by subtracting the sum of a next stage move and a next stage current WIP, from a next stage target averaged over a second predetermined time period.

12. The method according to claim 10, wherein the next stage average pull quantity is calculated for each of the fabrication stages.

13. A method of generating a suggestive dispatch lot list for use by a production line operator in selecting, from a plurality of lots, the lot to process at one of plurality of fabrication stages to maintain a predetermined production plan and fabrication target, the method comprising the steps of:

provding a plurality of lots to be processed in the production line during a predetermined time period; and sorting the lots in the list according to production line demand and supply between upstream and downstream fabrication stages, the sorting step including the step of calculating a current stage average push quantity.

14. A method of generating a suggestive dispatch lot list for use by a production line operator in selecting, from a plurality of lots, the lot to process at one of plurality of fabrication stages to maintain a predetermined production plan and fabrication target, the method comprising the steps of:

providing a plurality of lots to be processed in the production line during a predetermined time period; and sorting the lots in the list according to production line demand and supply between upstream and downstream fabrication stages, the sorting step including the step of calculating a next stage total pull quantity.

15. A method of generating a suggestive dispatch lot list for use by a production line operator in selecting, from a plurality of lots, the lot to process at one of plurality of fabrication stages to maintain a predetermined production plan and fabrication target, the method comprising the steps of:

providing a plurality of lots to be processed in the production line during a predetermined time period; and sorting the lots in the list according to production line demand and supply between upstream and downstream fabrication stages, the sorting step including the step of calculating a next stage average pull quantity.

* * * * *